US012798603B2

(12) United States Patent
Sato

(10) Patent No.: US 12,798,603 B2
(45) Date of Patent: Nov. 17, 2026

(54) DRIVING SUPPORT DEVICE

(71) Applicant: SUBARU CORPORATION, Tokyo (JP)

(72) Inventor: Junichi Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 9 days.

(21) Appl. No.: 19/089,162

(22) Filed: Mar. 25, 2025

(65) Prior Publication Data

US 2025/0326402 A1 Oct. 23, 2025

(30) Foreign Application Priority Data

Apr. 19, 2024 (JP) ................................ 2024-068103

(51) Int. Cl.

| | |
|---|---|
| ***B60W 50/14*** | (2020.01) |
| ***B60W 40/08*** | (2012.01) |
| ***G06V 20/59*** | (2022.01) |
| ***G06V 40/16*** | (2022.01) |

(52) U.S. Cl.

CPC ............ *B60W 50/14* (2013.01); *B60W 40/08* (2013.01); *G06V 20/597* (2022.01); *G06V 40/174* (2022.01); *B60W 2420/403* (2013.01); *B60W 2420/54* (2013.01); *B60W 2540/21* (2020.02); *B60W 2540/22* (2013.01)

(58) Field of Classification Search

CPC .. B60W 50/14; B60W 40/08; B60W 2540/21; B60W 2420/403; B60W 2420/54; B60W 2540/22; B60W 2540/221; B60W 2040/0872; B60W 2050/143; B60W 2520/00; G06V 40/174; G06V 20/597

See application file for complete search history.

(56) References Cited

U.S. PATENT DOCUMENTS

| | | | | |
|---|---|---|---|---|
| 2006/0235753 | A1* | 10/2006 | Kameyama ........ | G06Q 30/0201 705/15 |
| 2007/0192038 | A1* | 8/2007 | Kameyama ........... | G06F 16/436 707/E17.143 |
| 2020/0216078 | A1* | 7/2020 | Katz ..................... | B60W 40/09 |
| 2021/0061290 | A1* | 3/2021 | Kokubo .................. | G10L 25/63 |
| 2021/0269045 | A1* | 9/2021 | Katz ................. | G01C 21/3697 |
| 2025/0114022 | A1* | 4/2025 | Fujimoto ............. | A61B 5/7264 |

FOREIGN PATENT DOCUMENTS

| | | |
|---|---|---|
| JP | 2000-67347 A | 3/2000 |

* cited by examiner

*Primary Examiner* — Sisay Yacob
(74) *Attorney, Agent, or Firm* — Rimon P.C.

(57) ABSTRACT

A driving support device for a vehicle includes one or more processors, and a memory. The memory stores a program configured to be executed by the one or more processors. The program includes one or more commands. The commands are configured to cause the one or more processors to execute: a process of acquiring driver information related to a driver who drives the vehicle; a process of determining a psychological state of the driver using the driver information; a process of estimating a trouble using the psychological state; and a voice output process of causing a voice corresponding to the psychological state to be output based on that the trouble has been estimated.

15 Claims, 6 Drawing Sheets

FIG. 3

| PSYCHOLOGICAL STATE \ PARAMETER | KEYWORD | MOUTH CORNER CHANGE | EYEBROW INCLINATION CHANGE | EYEBROW HEIGHT CHANGE | SWEATING STATE | VEHICLE INTERIOR TEMPERATURE CHANGE |
|---|---|---|---|---|---|---|
| ANGER | WATCH OUT, HEY YOU, WHAT | ● | ● | – | ● | ● |
| SURPRISE | WATCH OUT, AH, WOW | ● | – | – | ● | ● |
| HATE | DISGUSTING, ANNOYING | ● | ● | ● | – | – |
| FEAR | NO WAY, I'M IN TROUBLE | – | – | – | ● | ● |

FIG. 5

| TROUBLE \ PARAMETER | POSITION INFORMATION | POSTURE CHANGE | VEHICLE SPEED/ VEHICLE BODY SPEED CHANGE | OUTSIDE AIR TEMPERATURE | WEATHER INFORMATION | TPMS AIR PRESSURE | WIPER OPERATION STATE | VEHICLE EXTERIOR OBJECT DETECTION INFORMATION |
|---|---|---|---|---|---|---|---|---|
| TAILGATING | ● | ● | ● | — | — | — | — | ● |
| FLAT TIRE/ TIRE COMING OFF | ● | ● | ● | — | — | ● | — | — |
| STUCK | ● | ● | ● | — | — | — | — | — |
| HEAVY RAIN/ SNOWSTORM | — | — | — | ● | ● | — | ● | — |

FIG. 6

| TROUBLE | PSYCHOLOGICAL STATE | PSYCHOLOGICAL SUPPORT ANNOUNCEMENT | OPERATION SUPPORT ANNOUNCEMENT |
|---|---|---|---|
| TAILGATING | ANGER | LEAVE IT AND CALM DOWN. TAKE A DEEP BREATH. | EVACUATE TO A SAFE PLACE. THE OCCUPANT SHOULD REPORT TO THE POLICE. |
| | HATE | LEAVE IT AND CALM DOWN. TAKE A DEEP BREATH. | |
| | FEAR | IT'S OKAY, CALM DOWN AND TAKE A DEEP BREATH SLOWLY. | |
| FLAT TIRE/ TIRE COMING OFF | FEAR | IT'S OKAY, CALM DOWN AND TAKE A DEEP BREATH SLOWLY. | STOP THE ENGINE AND TURN ON THE HAZARD LAMPS. REQUEST A NEARBY DEALER OR ROAD SERVICE PROVIDER TO RESCUE. |
| | SURPRISE | RELAX AS USUAL. | |
| STUCK | FEAR | IT'S OKAY, CALM DOWN AND TAKE A DEEP BREATH SLOWLY. | TURN ON THE HAZARD LAMPS. REQUEST A NEARBY DEALER OR ROAD SERVICE PROVIDER TO RESCUE. |
| | SURPRISE | RELAX AS USUAL. | |
| HEAVY RAIN/ SNOWSTORM | FEAR | IT'S OKAY, CALM DOWN AND TAKE A DEEP BREATH SLOWLY. | TURN ON THE HAZARD LAMPS AND THE HEADLAMPS. EVACUATE TO A SAFE PLACE WITHOUT STOPPING THE VEHICLE. |

DRIVING SUPPORT DEVICE

CROSS-REFERENCE TO RELATED APPLICATIONS

The present application claims priority from Japanese Patent Application No. 2024-068103 filed on Apr. 19, 2024, the entire contents of which are hereby incorporated by reference.

BACKGROUND

The disclosure relates to a driving support device that supports a driver, who drives a vehicle, in driving the vehicle.

Japanese Unexamined Patent Application Publication No. 2000-67347 discloses a technique in which, when a malfunction of a vehicle is detected, for example, a message indicating the occurrence of the malfunction and the malfunction content is output by voice guidance.

SUMMARY

An aspect of the disclosure provides a driving support device for a vehicle. The includes one or more processors, and a memory. The memory stores a program configured to be executed by the one or more processors. The program includes one or more commands. The commands are configured to cause the one or more processors to execute: a process of acquiring driver information related to a driver who drives the vehicle; a process of determining a psychological state of the driver using the driver information; a process of estimating a trouble using the psychological state; and a voice output process of causing a voice corresponding to the psychological state to be output based on that the trouble has been estimated.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 is an explanatory diagram presenting an example of a psychological state determination table according to the embodiment;

FIG. 5 is an explanatory diagram presenting an example of a trouble estimation table according to the embodiment; and FIG. 6 is an explanatory diagram presenting an example of a voice announcement selection table according to the embodiment.

DETAILED DESCRIPTION

Various troubles may occur while a vehicle is traveling. Some troubles that may occur while the vehicle is traveling, such as tailgating, are difficult to be immediately detected using the traveling state of the vehicle. Further, once the driver no longer maintains a usual psychological state due to a trouble, there is a possibility that the driver is hindered from appropriately driving the vehicle.

It is desirable to support a driver so that the driver can appropriately drive a vehicle when the occurrence of a certain trouble has been estimated.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

Figure 1:
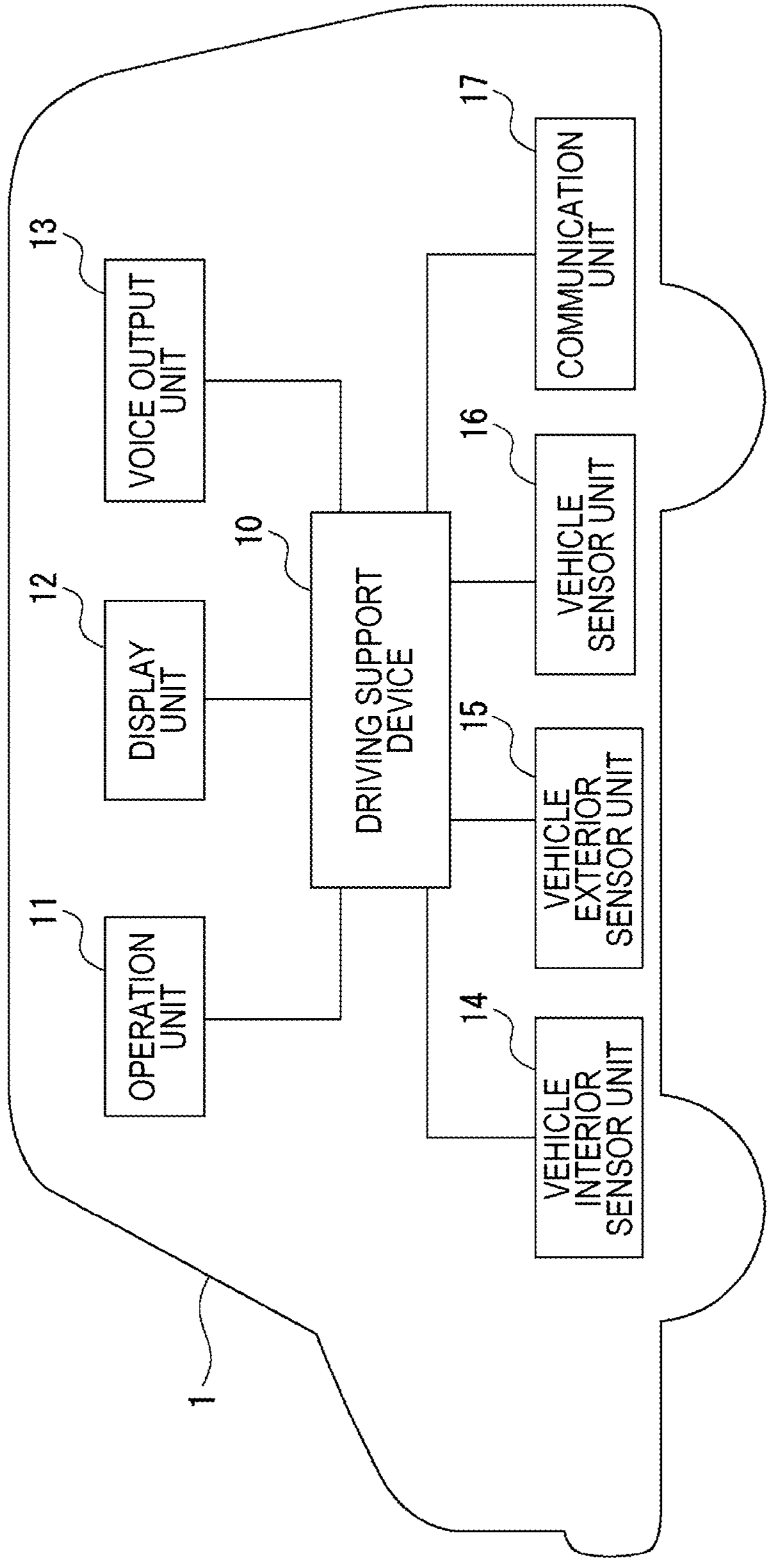
FIG. 1 is a block diagram of a vehicle configuration according to an embodiment of the disclosure.

FIG. 1 illustrates a vehicle 1 including a driving support device 10 according to the present embodiment.

The vehicle 1 includes the driving support device 10, an operation unit 11, a display unit 12, a voice output unit 13, a vehicle interior sensor unit 14, a vehicle exterior sensor unit 15, a vehicle sensor unit 16, and a communication unit 17.

FIG. 1 illustrates some components of the vehicle 1. The vehicle 1 includes various components for traveling and driving.

The driving support device 10 includes one or more processors. For example, the vehicle 1 includes one or more electronic control units (ECUs). The ECUs included in the vehicle 1 may include various ECUs such as a traveling control ECU, a charge control ECU that performs charge control of an in-vehicle battery, an engine control ECU, a display control ECU that performs display control of a display device (including a meter) included in the vehicle 1, a voice output control ECU that performs output control of a voice output device, a driving support ECU, an automatic driving ECU, and an air conditioning control ECU. The driving support device 10 may include any one of these ECUs in the vehicle or an ECU dedicated for the function according to the present embodiment.

The driving support device 10 includes a central processing unit (CPU), a read only memory (ROM), a random access memory (RAM), a nonvolatile memory, an input/output interface, and the like. The CPU executes various processes in accordance with a program stored in the ROM or the nonvolatile memory. The RAM stores data used for the CPU to execute various processes.

The operation unit 11 includes, for example, operators such as various buttons and levers disposed in front of a driver's seat of the vehicle 1. Further, the operation unit 11 may include a multi-function display (MFD) having a touch panel function or a display of a navigation device.

The display unit 12 comprehensively represents, for example, an MFD installed in front of the driver and other display devices for presenting information to the driver. The display unit 12 performs display based on instructions from various ECUs.

The voice output unit 13 comprehensively represents voice output devices such as various speakers installed in a vehicle cabin. The voice output unit 13 outputs various voices based on instructions from the driving support device 10 or another control device.

The vehicle interior sensor unit 14 includes various sensors that detect the state of an occupant in the vehicle cabin of the vehicle 1 and the state in the vehicle cabin. For example, the vehicle interior sensor unit 14 includes various sensors included in a driver monitoring system (DMS). The vehicle interior sensor unit 14 includes a vehicle interior imaging sensor that detects the facial expression or the like of the driver, an in-vehicle microphone for acquiring information on the voice uttered by the driver or an occupant, a pulse sensor that detects the pulse of the driver, a body temperature sensor that detects the body temperature of the driver, a humidity sensor that detects the sweating state of the driver, and a temperature sensor that detects the temperature in the vehicle cabin.

The various sensors described above are merely examples. The vehicle interior sensor unit 14 may include some of the sensors described above, or may include sensors other than those described above. The vehicle interior sensor unit 14 may include, for example, a weight sensor or a contact sensor that detects the presence of an occupant.

The vehicle exterior sensor unit 15 includes various sensors that detect the state outside the vehicle 1. For example, the vehicle exterior sensor unit 15 includes vehicle exterior imaging sensors that detect objects such as other vehicles, e.g., a preceding vehicle, pedestrians, and lanes present outside the vehicle, weather such as fine, rain, or snow outside the vehicle, and the circumstances such as flooding or snow accumulation; an outside air temperature sensor that detects the temperature outside the vehicle; and a gradient sensor that detects the gradient of the vehicle traveling path, such as a gyro sensor.

The various sensors described above are merely examples. The vehicle exterior sensor unit 15 may include some of the sensors described above, or may include sensors other than those described above. For example, the vehicle exterior sensor unit 15 may include a millimeter wave radar or a sonar that detects an object.

The vehicle sensor unit 16 includes various sensors that detect the traveling state of the vehicle 1 including the states of parts of the vehicle. For example, the vehicle sensor unit 16 includes a vehicle speed sensor that detects the speed of the vehicle, an acceleration sensor that detects the acceleration, an engine speed sensor that detects the engine speed, an accelerator opening sensor that detects the accelerator opening, a steering angle sensor that detects the steering angle, a yaw rate sensor that detects the yaw rate, a tire air pressure sensor included in a tire pressure monitoring system (TPMS), and a global navigation satellite system (GNSS) sensor that receives information used for recognizing position information of the vehicle 1, such as a global positioning system (GPS) sensor.

The various sensors described above are merely examples. The vehicle sensor unit 16 may include some of the sensors described above, or may include sensors other than those described above.

The driving support device 10 executes various processes and controls using various detection signals obtained by sensor units such as the vehicle interior sensor unit 14, the vehicle exterior sensor unit 15, and the vehicle sensor unit 16. The driving support device 10 performs, for example, image analysis and voice recognition based on the detection signals obtained by the sensor units.

The communication unit 17 performs network communication and vehicle-to-vehicle communication. The communication unit 17 can acquire various kinds of information, for example, surrounding environment information, weather information, and road information of the current location through network communication such as the Internet. The driving support device 10 executes various processes and controls using the information acquired by the communication unit 17.

Example Processes

The processes according to the embodiment implemented in the driving support device 10 will be described.

Various troubles may occur while the vehicle 1 is traveling. The troubles mentioned here are various difficulties and phenomena that occur due to external factors of the driver. The external factors of the driver are factors other than the driver, such as other vehicles, road surface states, and environmental conditions such as weather. Examples of such troubles include tailgating by another vehicle, a flat tire or coming off of a tire, stuck, and weather that causes difficulty in driving, such as heavy rain or snowstorm.

Some troubles, such as tailgating, are difficult to be immediately detected using the traveling state of the vehicle 1. Further, once the driver no longer maintains a usual psychological state due to a trouble, there is a possibility that the driver is hindered from appropriately driving the vehicle 1.

Thus, in the processes according to the embodiment, a psychological state of the driver is determined during traveling of the vehicle 1, and a trouble is estimated using the psychological state. Further, a voice corresponding to the psychological state is output based on that the trouble has been estimated.

Figure 2:
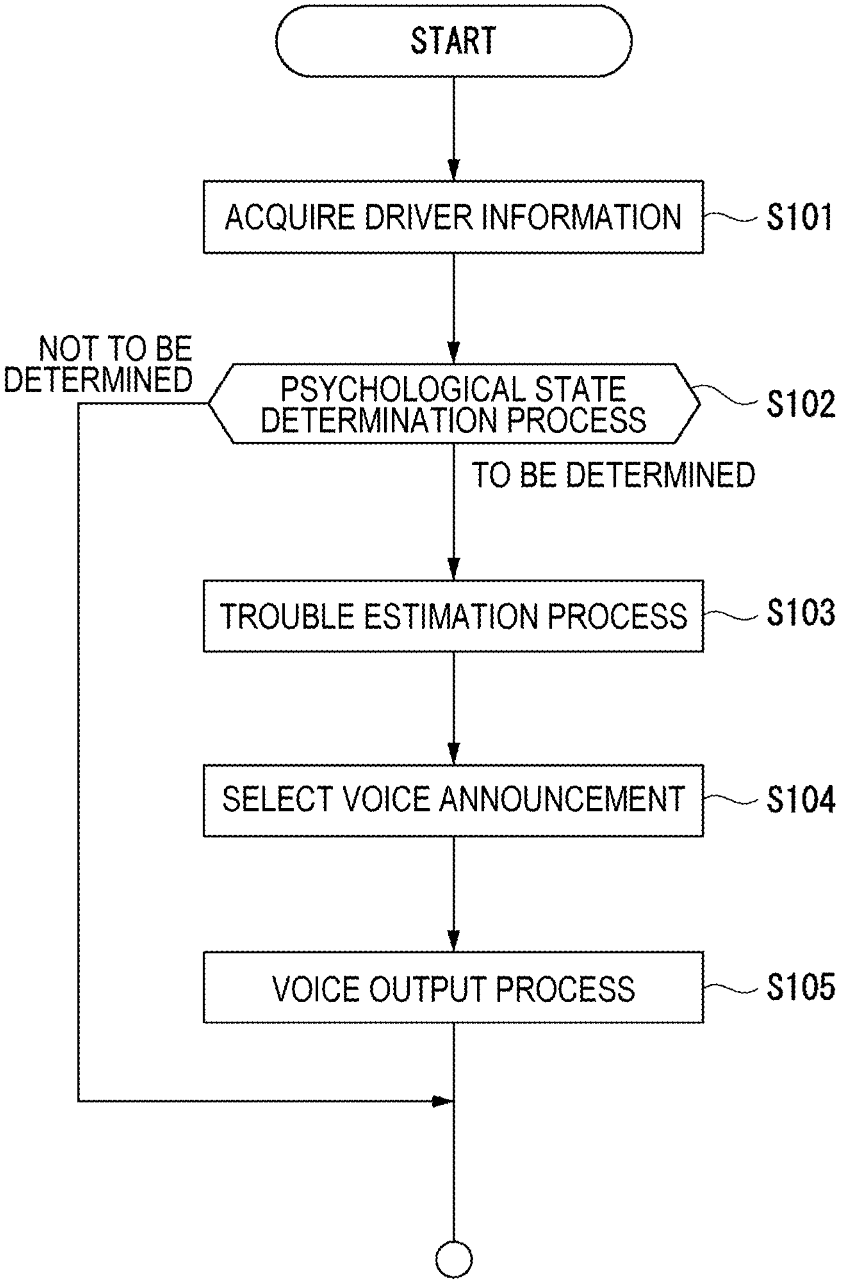
FIG. 2 is a flowchart of example processes of a driving support device according to the embodiment.

FIG. 2 is an example of processes that are executed by the driving support device 10. For example, the driving support device 10 periodically and repeatedly executes the processes of FIG. 2 during traveling of the vehicle 1.

In step S101, the driving support device 10 acquires driver information.

The driver information is information related to the driver of the vehicle 1. The driver information is obtained using detection signals from the vehicle interior sensor unit 14 or by analysis on the detection signals. The driver information is, for example, information on the facial expression of the driver obtained by image analysis, information on the voice uttered by the driver and obtained by voice recognition, biological information such as the sweating state or the heart rate of the driver, and temperature information on the inside of the vehicle cabin in which the driver is present.

In step S102, the driving support device 10 executes a psychological state determination process.

The driving support device 10 determines a psychological state of the driver using the driver information acquired in step S101, as the psychological state determination process.

The psychological state of the driver is the state of emotion or mood that is expected to be felt by the driver.

In the processes according to the embodiment, a psychological state suggesting the occurrence of a certain trouble is set as a psychological state to be determined. Examples of such psychological states include anger, surprise (tension), hate, and fear (haste). In the following, an example will be described in which "anger", "surprise", "hate", and "fear" are provided as psychological states to be determined.

The driving support device 10 determines the psychological state of the driver using the driver information, for example, with reference to a predetermined psychological state determination table.

FIG. 3 presents an example of the psychological state determination table. The psychological state determination table is stored in, for example, a storage area of the ROM or the nonvolatile memory of the driving support device 10.

In the psychological state determination table of FIG. 3, values such as determination values are set for predetermined parameters for each of the psychological states of "anger", "surprise", "hate", and "fear". The parameters include keyword, mouth corner change, eyebrow inclination change, eyebrow height change, sweating state, and vehicle interior temperature change. The keyword mentioned here is a word or a phrase that the driver may utter in each psychological state.

In the example of FIG. 3, for the psychological state of "anger", values used for the determination of "anger" are set for the parameters of mouth corner change, eyebrow inclination change, sweating state, and vehicle interior temperature change. In addition, "watch out", "hey you", and "what" are set as keywords corresponding to the psychological state of "anger".

The driving support device 10 obtains, for example, the value of each parameter using the acquired driver information, and when there is a corresponding psychological state to be determined in the psychological state determination table, the driving support device 10 determines that the psychological state of the driver is the psychological state to be determined.

When it is determined that the psychological state of the driver is the psychological state to be determined, the driving support device 10 advances the process to step S103.

In contrast, when it is determined that the psychological state of the driver does not correspond to any one of the psychological states to be determined, that is, the psychological state of the driver is not the psychological state to be determined, the driving support device 10 ends the processes of FIG. 2. That is, when the psychological state of the driver does not suggest the occurrence of a certain trouble, the driving support device 10 does not perform the processes in step S103 and the subsequent steps.

In step S103, the driving support device 10 executes a trouble estimation process.

As the trouble estimation process, the driving support device 10 estimates a trouble using the psychological state of the driver determined in step S102. In the following, an example will be described in which "tailgating", "flat tire/tire coming off", "stuck", and "heavy rain/snowstorm" are provided as the troubles to be estimated.

Here, an example process of the trouble estimation process will be described.

In this example process, the driving support device 10 first refers to a predetermined trouble estimation algorithm and narrows down candidates for a trouble that may have occurred using the psychological state.

Figure 4:
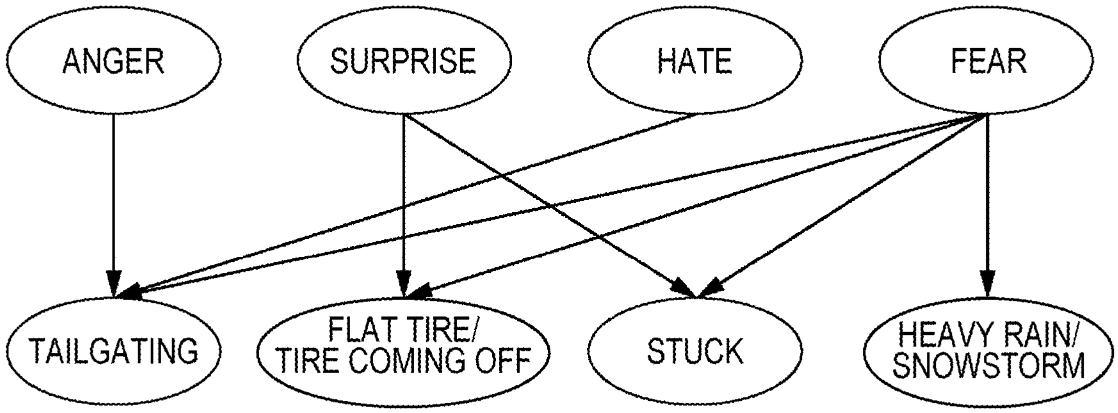
FIG. 4 is an explanatory diagram presenting an example of a trouble estimation algorithm according to the embodiment.

FIG. 4 illustrates an example of the trouble estimation algorithm. The trouble estimation algorithm is stored in, for example, a storage area of the driving support device 10.

In the trouble estimation algorithm, one or more troubles that may have occurred are associated with each psychological state. In the example of FIG. 4, for example, one trouble of "tailgating" is associated with the psychological state of "anger", and two troubles of "flat tire/tire coming off" and "stuck" are associated with the psychological state of "surprise".

By using such a trouble estimation algorithm, it is possible to narrow down the candidates for the trouble that may have occurred to some or one using the psychological state.

Then, the driving support device 10 acquires vehicle information of the vehicle 1.

The vehicle information is information related to the state of the vehicle 1 such as the traveling state of the vehicle 1 or the state outside the vehicle 1. The vehicle information is obtained using detection signals from the vehicle exterior sensor unit 15 or the vehicle sensor unit 16 or by analysis on the detection signals, and also includes an operation signal via the operation unit 11 or information obtained by the communication unit 17. Examples of the vehicle information include information related to the traveling state of the vehicle 1 such as position information of the vehicle 1, a change in posture of the vehicle body, a change in vehicle speed/vehicle body speed, a TPMS air pressure, a wiper operation state, and a lighting state of an in-vehicle lamp; and information related to the external state of the vehicle 1 such as an outside air temperature, weather information, and vehicle exterior object detection information.

Then, the driving support device 10 estimates a trouble using the vehicle information with reference to a predetermined trouble estimation table.

FIG. 5 presents an example of the trouble estimation table. The trouble estimation table is stored in, for example, a storage area of the driving support device 10.

In the trouble estimation table of FIG. 5, values such as determination values are set for predetermined parameters for each of the troubles of "tailgating", "flat tire/tire coming off", "stuck", and "heavy rain/snowstorm". The parameters include position information, posture change, vehicle speed/vehicle body speed change, outside air temperature, weather information, TPMS air pressure, wiper operation state, and vehicle exterior object detection information.

In the example of FIG. 5, for the trouble of "tailgating", values used for determination of "tailgating" are set for the parameters of position information, posture change, vehicle speed/vehicle body speed change, and vehicle exterior object detection information.

For example, the driving support device 10 narrows down the candidates for the trouble that may have occurred to multiple candidates using the psychological state, then obtains the value of each parameter using the acquired vehicle information, and selects a proper trouble from the candidates with reference to the trouble estimation table, thereby estimating the trouble.

Alternatively, for example, the driving support device 10 may narrow down the candidates for the trouble that may have occurred to one candidate using the psychological state, then obtain the value of each parameter using the acquired vehicle information, and select the candidate when the candidate is proper with reference to the trouble estimation table, thereby estimating the trouble.

In the above, as the example process of the trouble estimation process, the example has been described in which the driving support device 10 estimates the trouble using the psychological state and the vehicle information. However, the example of the trouble estimation process is not limited to the above. For example, the driving support device 10 may estimate the trouble using the psychological state. The driving support device 10 may estimate the trouble with reference to, for example, a table including both information on the psychological state and the vehicle information, without separately executing the process using the psychological state and the process using the vehicle information.

Based on that the trouble has been estimated in step S103, the driving support device 10 advances the process to step S104.

In step S104, the driving support device 10 selects a voice announcement.

The driving support device 10 selects the voice announcement based on that the trouble has been estimated. The driving support device 10 selects the voice announcement based on, for example, a predetermined voice announcement selection table.

FIG. 6 presents an example of the voice announcement selection table. In the voice announcement selection table presented in FIG. 6, a psychological support announcement depending on the psychological state is set for each of the troubles of "tailgating", "flat tire/tire coming off", "stuck", and "heavy rain/snowstorm". Further, an operation support announcement is set for each trouble.

The psychological support announcement is a voice announcement to the driver. For example, the psychological support announcement represents an advice or a call to urge the driver to get the usual psychological state again. In one example, the psychological support announcement represents a call for making the driver in the psychological state of such as "anger" calm down or feel safe.

The operation support announcement is a voice announcement that instructs a driving operation of the vehicle 1. For example, the operation support announcement represents an instruction of a driving operation (for example, evacuation to a safe place or lighting of hazard lamps) of the vehicle 1 to deal with the estimated trouble. The operation support announcement may include an instruction of an action (report to the police or the like) to an occupant in addition to the instruction of the driving operation of the vehicle 1 to the driver.

In the voice announcement selection table of FIG. 6, for example, for the trouble of "tailgating", a psychological support announcement of "Leave it and calm down. Take a deep breath." is set for each of the psychological states of "anger" and "hate". A psychological support announcement of "It's okay. Calm down and take a deep breath slowly." is set for the psychological state of "fear". Further, an operation support announcement of "Evacuate to a safe place. The occupant should report to the police." is set for the trouble of "tailgating".

The driving support device 10 selects a psychological support announcement as the voice announcement corresponding to the psychological state determined in step S102 and the trouble estimated in step S103 with reference to the voice announcement selection table based on that the trouble has been estimated in step S103. Further, the driving support device 10 selects an operation support announcement as the voice announcement corresponding to the trouble estimated in step S103.

In the example of using the vehicle information in the trouble estimation process in step S103 as in the present embodiment, the voice announcement corresponding to the trouble is also the voice announcement corresponding to the vehicle information (that is, the vehicle state indicated by the vehicle information).

For example, when the estimated trouble is "tailgating" and the determined psychological state is "anger", the driving support device 10 selects "Leave it and calm down. Take a deep breath." set for "tailgating" as the psychological support announcement corresponding to "anger" with reference to the voice announcement selection table.

Even when the estimated trouble is "tailgating" which is the same, in a case where the determined psychological state is "fear", the driving support device 10 selects "It's okay. Calm down and take a deep breath slowly." as the psychological support announcement. Even for the same trouble, some drivers may have different psychological states. Thus, by setting the psychological support announcements which differ depending on the psychological state for the same trouble, it is possible to perform effective psychological support in accordance with the psychological state of each driver.

When the estimated trouble is "tailgating", the driving support device 10 selects "Evacuate to a safe place. The occupant should report to the police." as the operation support announcement corresponding to the trouble with reference to the voice announcement selection table.

Even when the determined psychological state is "fear" which is the same, in a case where the estimated trouble is "flat tire/tire coming off" which is different, the driving support device 10 selects "Stop the engine and turn on the hazard lamps. Request a nearby dealer or road service provider to rescue." as the operation support announcement. Even in the same psychological state, the response such as the appropriate driving operation differs depending on the trouble or the actual vehicle state. Thus, by setting the operation support announcements which differ depending on the trouble, it is possible to perform effective operation support corresponding to each trouble or vehicle state.

Although FIG. 6 presents the example in which one operation support announcement is set for one trouble, operation support announcements which differ, for example, depending on the psychological state may be set for one trouble. Further, for example, an operation support announcement corresponding to vehicle information such as the lighting state of the in-vehicle lamp may be set.

In the example of FIG. 6, the psychological support announcement corresponding to one psychological state is the same regardless of the type of trouble. However psychological support announcements which differ, for example, depending on the trouble may be set for one psychological state.

In addition, in the example of FIG. 6, the voice data to be actually output as the voice announcement is set. However, a keyword to be included in the voice announcement or an instruction of announcement content may be set instead of the voice data. In this case, the driving support device 10 may generate voice data of a voice announcement based on the keyword or the instruction of announcement content.

The driving support device 10 advances the process to step S105 based on that the voice announcement has been selected in step S104.

In step S105, the driving support device 10 performs a voice output process of causing the voice announcement to be output. The driving support device 10 causes, for example, the voice output unit 13 to output the psychological support announcement and the operation support announcement selected in step S104 as the voice output process.

By the processes of FIG. 2, the psychological support announcement and the operation support announcement are output based on that the trouble has been estimated using the psychological state of the driver.

The following effects are obtained in the above embodiment.

The driving support device 10 for the vehicle 1 according to the embodiment executes the process of acquiring the driver information related to the driver who drives the vehicle 1, the process of determining the psychological state of the driver using the driver information, the process of estimating the trouble using the psychological state, and the voice output process of causing the voice (voice announcement) corresponding to the psychological state to be output based on that the trouble has been estimated (see steps S101 to S105 in FIG. 2).

Accordingly, since the voice (voice announcement) corresponding to the psychological state is output based on that the trouble has been estimated, when the occurrence of a certain trouble has been estimated using the psychological state of the driver, it is possible to support the driver so that the driver can appropriately drive the vehicle 1. In particular, since the voice announcement corresponding to the psychological state is output, it is possible to perform support suitable for the psychological state of the driver. Further, since the trouble is estimated using the psychological state, it is easy to detect the possibility of the occurrence of the trouble even when the occurrence of the trouble is difficult to be immediately detected using the traveling state of the vehicle 1.

The voice (voice announcement) corresponding to the psychological state includes the announcement (the psychological support announcement according to the embodiment) selected in accordance with the psychological state and the announcement (the operation support announcement according to the embodiment) selected in accordance with the trouble estimated using the psychological state.

In the embodiment, the example has been described in which the voice announcement corresponding to the psychological state is selected based on that one trouble (that is, the type of trouble) has been estimated in the trouble estimation process. In contrast, even when it is difficult to estimate the type of trouble, for example, when the probability of the type of the candidate for the trouble narrowed down using the psychological state is low from the viewpoint of the vehicle information, the voice (voice announcement) corresponding to the psychological state may be selected based on that the occurrence of a certain trouble has been estimated using the psychological state. In such an embodiment, even when it is difficult to estimate the type of trouble, it is possible to provide support suitable for the psychological state to the driver who is not in the usual psychological state, based on that the trouble has been estimated.

In the embodiment, the example has been described in which the driving support device 10 executes the process of acquiring the vehicle information of the vehicle 1, and executes, as the voice output process, the process of causing the voice (voice announcement) corresponding to the vehicle information to be output in response to that the trouble has been estimated (see steps S103 to S105 in FIG. 2, and FIG. 6).

Accordingly, in addition to the voice (for example, the psychological support announcement) corresponding to the psychological state, the voice (the operation support announcement) corresponding to the vehicle information is output. By outputting the voice announcement with regard to the vehicle information in addition to the psychological state, it is possible to perform appropriate support corresponding to the vehicle state indicated by the vehicle information.

In the embodiment, the example has been described in which the driving support device 10 estimates the trouble using the psychological state and the vehicle information in the trouble estimation process (see step S103 in FIG. 2). In this case, since the trouble is estimated using the vehicle information in addition to the psychological state, the accuracy of the trouble estimation can be improved. In contrast, even when the vehicle information is not used in the trouble estimation process, the vehicle information may be additionally acquired and the voice (operation support announcement) corresponding to the vehicle information may be output.

In the embodiment, the example has been described in which the driving support device 10 executes, as the voice output process, the process of causing the voice (voice announcement) corresponding to the estimated trouble to be output based on that the trouble has been estimated (see steps S104 to S105 in FIG. 2, and FIG. 6).

Accordingly, the voice (voice announcement) corresponding to the estimated trouble is output. In the embodiment, the example has been described in which the voice announcement is selected with reference to the table in which the operation support announcement and the psychological support announcement depending on the psychological state are set for the trouble. By selecting and outputting the voice announcement with regard to the estimated trouble in addition to the psychological state, it is possible to perform support more suitable for the circumstances of the driver.

In the embodiment, the example has been described in which the voice (voice announcement) includes the psychological support announcement to the driver and the operation support announcement that instructs the operation of the vehicle 1 (see steps S104 to S105 in FIG. 2, and FIG. 6).

Accordingly, the two types of voice announcements, that is, the psychological support announcement and the operation support announcement, are output based on that the trouble has been estimated. In this case, the driver can be supported from both aspects of the psychology and the driving operation.

In the embodiment, the example has been described in which the psychological support announcement and the operation support announcement are output. However, one announcement of the psychological support announcement and the operation support announcement selected in accordance with the psychological state may be output.

In the embodiment, the example has been described in which the driver information includes the information on the facial expression of the driver and the information on the voice uttered by the driver (see step S101 in FIG. 2, and FIG. 3).

By acquiring the information on the facial expression of the driver and the information on the voice uttered by the driver as the driver information, the psychological state of the driver can be determined with high accuracy. In addition, for example, information that can be acquired using the DMS mounted on the vehicle 1 for other purposes such as prevention of the driver from falling asleep can be effectively used.

The driving support device 10 may acquire partial information of the driver information exemplified in the embodiment, or may acquire other information related to the driver as the driver information.

The setting of the parameters and the values of the parameters in the psychological state determination table and the trouble estimation table described in the embodiment is an example. As the tables, the voice announcement selection table, and the trouble estimation algorithm, for example, a predetermined table or algorithm set by the provider of the driving support device 10 may be used, or a table or algorithm customized for the driver may be used.

In the embodiment, the example has been described in which the voice output unit 13 is caused to output the voice announcement corresponding to the psychological state.

However, in addition to or instead of the voice announcement, the display unit 12 may be caused to display a similar announcement corresponding to the psychological state.

According to the embodiment of the disclosure, since the voice corresponding to the psychological state is output based on that the trouble has been estimated, when the occurrence of a certain trouble has been estimated using the psychological state of the driver, it is possible to support the driver so that the driver can appropriately drive the vehicle.

The invention claimed is:

1. A driving support device for a vehicle, the driving support device comprising:

one or more processors; and a memory storing a program configured to be executed by the one or more processors, wherein the program comprises one or more commands, and wherein the commands are configured to cause the one or more processors to perform:

a process of acquiring driver information related to a driver who drives the vehicle;

a process of determining, using the driver information, a psychological state of the driver from among a plurality of predetermined psychological states;

a process of acquiring vehicle information of the vehicle;

a process of estimating, using the determined psychological state and the vehicle information, a trouble occurring due to an external factor of the driver during traveling of the vehicle from among a plurality of predetermined troubles; and a voice output process including, based on the trouble having been estimated, selecting, based on voice announcement selection information, a psychological support announcement corresponding to both the determined psychological state and the estimated trouble and an operation support announcement corresponding to the estimated trouble, and causing a voice announcement including the psychological support announcement and the operation support announcement to be output.

2. The driving support device according to claim 1, wherein, for a same estimated trouble, the operation support announcement differs depending on the determined psychological state.

3. The driving support device according to claim 1, wherein, for a same determined psychological state, the operation support announcement differs depending on the estimated trouble.

4. The driving support device according to claim 1, wherein the psychological support announcement represents advice or a call to urge the driver to return to a usual psychological state, and wherein the operation support announcement instructs a driving operation of the vehicle to deal with the estimated trouble.

5. The driving support device according to claim 1, wherein the driver information comprises information on a facial expression of the driver and information on a voice uttered by the driver.

6. The driving support device according to claim 2, wherein the driver information comprises information on a facial expression of the driver and information on a voice uttered by the driver.

7. The driving support device according to claim 1, wherein the plurality of predetermined psychological states are psychological states suggesting occurrence of the trouble.

8. The driving support device according to claim 7, wherein the plurality of predetermined psychological states include anger, surprise, hate, and fear.

9. The driving support device according to claim 1, wherein the process of estimating the trouble includes narrowing down one or more candidates for the trouble using the determined psychological state, and selecting the trouble from the one or more candidates using the vehicle information.

10. The driving support device according to claim 9, wherein the one or more candidates are narrowed down based on trouble estimation information in which one or more of the plurality of predetermined troubles are associated with each of the plurality of predetermined psychological states.

11. The driving support device according to claim 1, wherein the vehicle information includes information related to a traveling state of the vehicle and information related to a state outside the vehicle.

12. The driving support device according to claim 1, wherein the plurality of predetermined troubles include tailgating by another vehicle, a flat tire or coming off of a tire, stuck, and heavy rain or snowstorm.

13. The driving support device according to claim 1, wherein, for a same estimated trouble, the psychological support announcement differs depending on the determined psychological state.

14. The driving support device according to claim 1, wherein the voice announcement selection information includes at least one of voice data to be output as the voice announcement, a keyword to be included in the voice announcement, and an instruction of announcement content of the voice announcement.

15. The driving support device according to claim 4, wherein the operation support announcement further comprises an instruction of an action to an occupant of the vehicle.

* * * * *